United States Patent

Nandagopal et al.

(10) Patent No.: US 8,516,152 B2
(45) Date of Patent: Aug. 20, 2013

(54) LOOKAHEAD COMPUTATION OF ROUTING INFORMATION

(75) Inventors: Thyaga Nandagopal, Edison, NJ (US); Kiran M. Rege, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 314 days.

(21) Appl. No.: 12/944,928

(22) Filed: Nov. 12, 2010

(65) Prior Publication Data

US 2012/0124235 A1    May 17, 2012

(51) Int. Cl.
*G06F 15/173* (2006.01)

(52) U.S. Cl.
USPC ........................................................ 709/242

(58) Field of Classification Search
USPC .................................. 709/220–226, 238–244
See application file for complete search history.

(56) References Cited

U.S. PATENT DOCUMENTS

| | | | |
|---|---|---|---|
| 4,905,233 A * | 2/1990 | Cain et al. ...................... | 370/237 |
| 6,697,325 B1 * | 2/2004 | Cain .............................. | 370/217 |
| 6,850,524 B1 * | 2/2005 | Troxel et al. .............. | 370/395.32 |
| 8,010,694 B2 * | 8/2011 | Doverspike et al. .......... | 709/235 |
| 8,274,914 B2 * | 9/2012 | Karaoguz et al. ............. | 370/254 |
| 2002/0131362 A1 * | 9/2002 | Callon .......................... | 370/216 |
| 2003/0033394 A1 | 2/2003 | Stine | |
| 2004/0218548 A1 * | 11/2004 | Kennedy et al. .............. | 370/254 |
| 2007/0274268 A1 * | 11/2007 | Axelsson et al. ............. | 370/338 |
| 2008/0159151 A1 * | 7/2008 | Datz et al. ..................... | 370/238 |

FOREIGN PATENT DOCUMENTS

EP    1137228    9/2001

OTHER PUBLICATIONS

K. Lakshminarayanan, M. Caesar, M. Rangan, T. Anderson, S. Shenker, and I. Stoica. Achieving Convergence-Free Routing with Failure-Carrying packets. In Proc. ACM SIGCOMM, Kyoto, Japan, Aug. 2007.*
J. May, OSPF Version 2, Ascend Communications, Inc., Apr. 1998, The Internet Society (1998), RFC 2328. pp. 1-245.
R. Coltun et al., OSPF for IPv6, Jul. 2008, RFC 5340 pp. 1-95.
Peyravin et al. "Network path caching: Issues, algorithms and a simulation study" Computer Communications, Elsevier Science Publishers BV, Amsterdam, NL. vol. 20, No. 8., Aug. 25, 1997 (May 25, 1997) pp. 605-614.
Apostololopoulous G et al. On Reducing the processing cost of on-demand QoS Path computation Network Protocols, 1998. Proceeding Sixth International Conference 0 N Austin, TX, USA Oct. 13-16, 1998, pp. 80-89.
International Search Report for PCT/US2011/054625 dated Nov. 21, 2011.

* cited by examiner

*Primary Examiner* — Brendan Higa
(74) *Attorney, Agent, or Firm* — Kramer & Amado P.C.

(57) ABSTRACT

Various exemplary embodiments relate to a method and related network node including one or more of the following: receiving, at the node, an indication that a current network state has changed to a new network state from an old network state; determining whether the node has access to pre-computed routing information associated with the new network state; if the node has access to pre-computed routing information associated with the new network state, using the pre-computed routing information to route future network traffic; and if the node does not have access to pre-computed routing information associated with the new network state, computing new routing information and using the new routing information to route future network traffic.

20 Claims, 6 Drawing Sheets

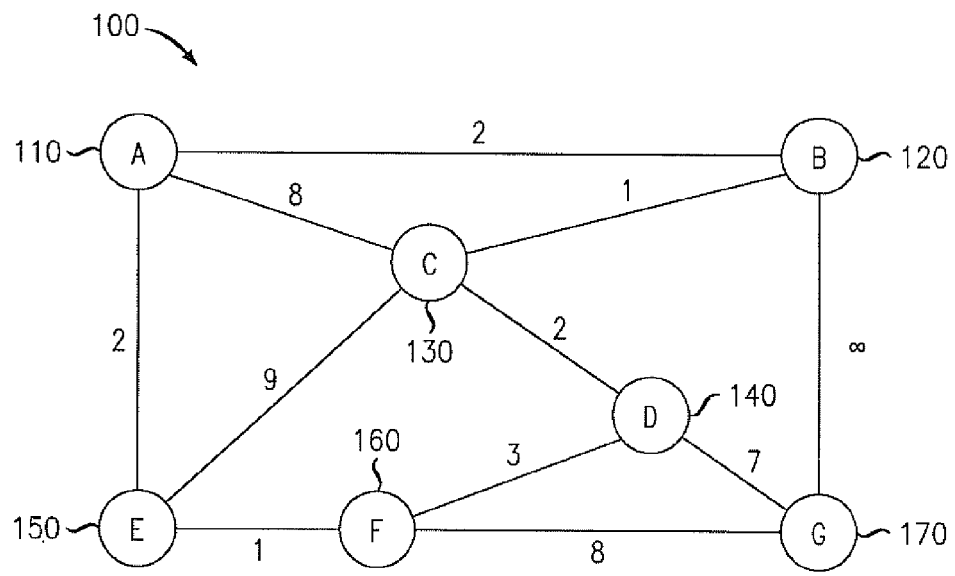
*FIG. 1*
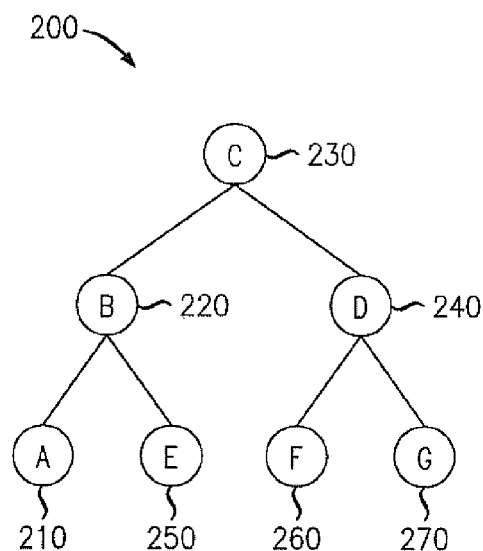
*FIG. 2*
| | Destination | Next Hop |
|---|---|---|
| 310 | A | B |
| 320 | B | B |
| 340 | D | D |
| 350 | E | B |
| 360 | F | D |
| 370 | G | D |
*FIG. 3*

LOOKAHEAD COMPUTATION OF ROUTING INFORMATION

TECHNICAL FIELD

Various exemplary embodiments disclosed herein relate generally to network traffic routing.

BACKGROUND

Packet-switched networks are used to provide an ever-increasing amount of today's varied forms of communication. In addition to computer-to-computer communication via networks such as the Internet, packet-switched networks enable the communication of information associated with other applications such as television, telephone, and radio. Through these and other applications, end users may transmit and receive a multitude of information types over great distances.

In order to move such information from its source to its destination, packet-switched networks employ a number of interconnected routing devices. When one router receives a packet of data, the router will determine where the packet's destination is located and forward the packet to the next closest router. This next router will follow a similar procedure and, in this manner, the packet will eventually be delivered to its destination, much like a "bucket brigade."

One significant problem in packet switched networks is providing each router within the network with the information necessary to make the determination of which "next hop" router to which each packet should be transmitted. While, in theory, this information could be manually programmed into the router, the size and dynamic nature of network topologies usually render this method impracticable. Instead, various protocols have been developed for automatically determining the best path to each destination for each router. For example, the Open Shortest Path First standard provides for routers within an autonomous system to share information regarding the state of links within the system. Using this information, each router can independently develop a forwarding table for use in determining how packets are forwarded toward their respective destinations. When the network state changes, each router updates its forwarding table to ensure that each destination remains reachable and that each path chosen is optimal. The routing information maintained by different routers in a network should be consistent with one another to enable the desired operation of the network.

SUMMARY

While standards such as Open Shortest Path First provide a working solution to the problem of generating routing information, these standards take time to work. For example, immediately after a network change occurs, the routing information at each node is, to some extent, out of date and incorrect. The information will remain outdated until each node receives an indication of the change, determines the new state of the network, determines the optimal routing paths, and updates the forwarding table. With the potential frequency of nodes being added to the network, nodes being removed from the network, nodes entering a faulty state, nodes recovering from a faulty state, and other network changing events, a considerable portion of a router's operating time may be spent either forwarding traffic according to outdated routing information or waiting for up-to-date routing information. This time between the network-changing event and a successful update of forwarding tables at all nodes within the network is referred to herein as the network convergence time.

Accordingly, there is a need for a method of reducing the amount of time between a network-changing event and convergence of routing information at different nodes within the network. In particular, it would be desirable to provide a method and network node that reduces the amount of time spent updating forwarding tables.

In light of the present need for a method of reducing network convergence time, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various exemplary embodiments provide a network router that may predict likely future network states. Such a network router may then pre-compute and store routing information, such as a shortest path tree, forwarding table, and/or routing table, for these likely future network states. Thereafter, when the network node receives an indication that the network state has changed, the node may first check whether the new network state is one for which the routing information has been pre-computed. If so, the node may use the pre-computed routing information, thereby reducing the amount of time before the routing information is up-to-date. According to this first exemplary embodiment, all prediction and pre-computation functions are performed locally at the network node.

Various alternative embodiments provide for a prediction node that performs at least some of these and other prediction functions for other nodes within the network. For example, the prediction node may simply predict likely and relevant future network states for the other nodes and transmit this information to the appropriate nodes. Each other node may then pre-compute routing information associated with the future network states locally. Alternatively, the prediction node may pre-compute the routing information for each of the other nodes and transmit the associated routing information to each of the other nodes along with the future state information. The other nodes then only have to store this information for future use.

Various exemplary embodiments relate to a method and related network node including one or more of the following: receiving, at the node, an indication that a current network state has changed to a new network state from an old network state; determining whether the node has access to pre-computed routing information associated with the new network state; if the node has access to pre-computed routing information associated with the new network state, using the pre-computed routing information to route future network traffic; and if the node does not have access to pre-computed routing information associated with the new network state, computing new routing information and using the new routing information to route future network traffic.

Various exemplary embodiments additionally or alternatively relate to a method and related network node including one or more of the following: a first interface that receives network state information; and a network state predictor that predicts at least one future network state based on the network state information, wherein the at least one future network state is different from a current network state.

It should be apparent that, in this manner, various exemplary embodiments enable reduction of network convergence time. In particular, by pre-computing routing information for likely future network states, a network node can reduce the amount of time spent updating a forwarding table after the network actually changes.

BRIEF DESCRIPTION OF THE DRAWINGS

In order to better understand various exemplary embodiments, reference is made to the accompanying drawings, wherein:

FIG. 1 illustrates an exemplary network for routing data packets;

FIG. 2 illustrates an exemplary shortest path tree for determining the optimal path from one node to a number of other possible nodes;

FIG. 3 illustrates an exemplary forwarding table for determining a next hop to which a packet should be transmitted based on the packet destination;

DETAILED DESCRIPTION

Figure 4:
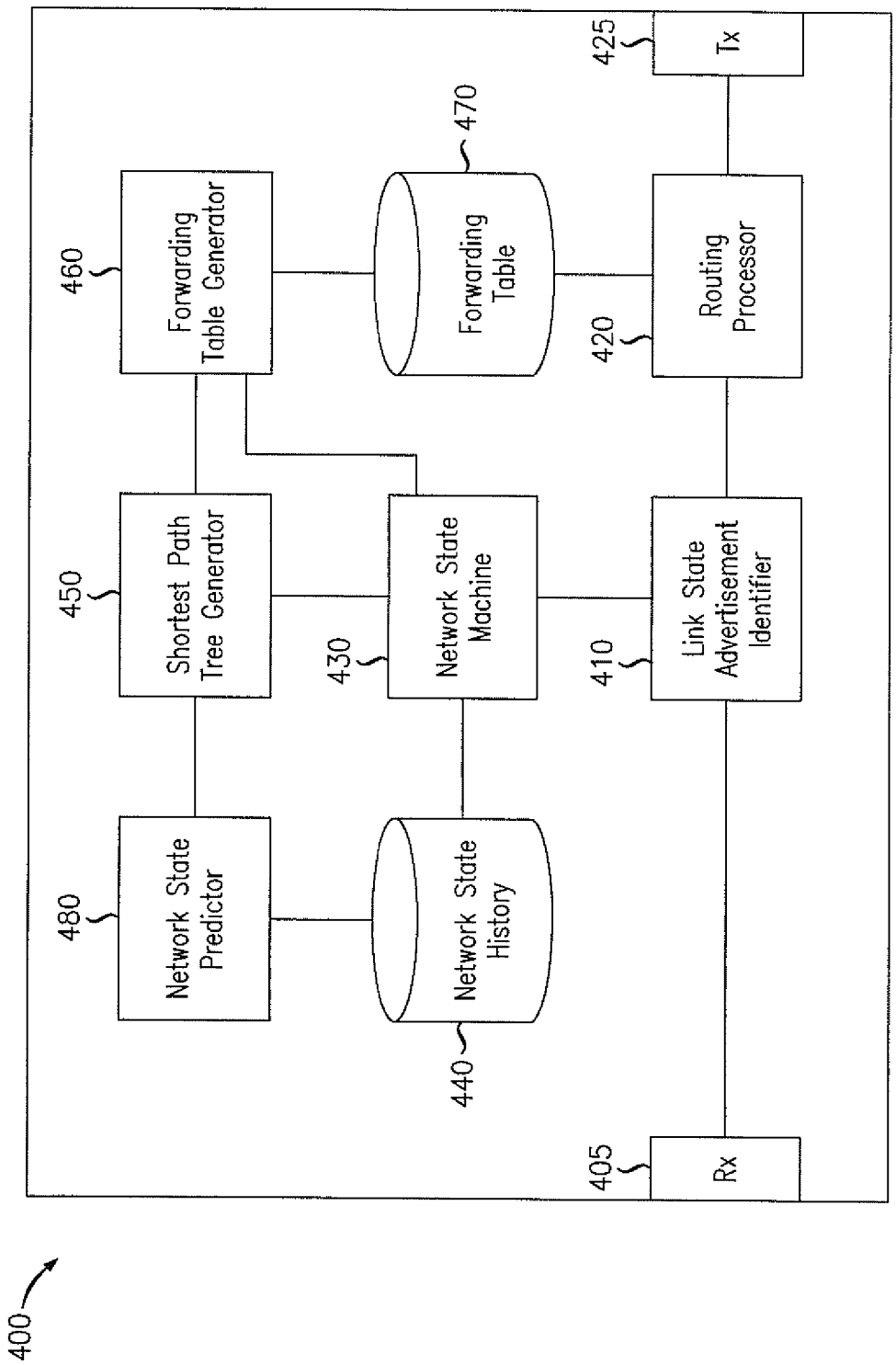
FIG. 4 illustrates an exemplary network node for routing packets and reducing network convergence time.

Referring now to the drawings, in which like numerals refer to like components or steps, there are disclosed broad aspects of various exemplary embodiments.

FIG. 1 illustrates an exemplary network 100 for routing data packets. Exemplary network 100 may be a packet-switched communications network for providing data transfer for various applications. Exemplary network 100 may further implement a standard for automatic updating of routing information in response to changes within the network. For example, network 100 may constitute an autonomous system implementing the Open Shortest Path First (OSPF) standard.

Exemplary network may include a number of nodes A-G 110-170. Each node A-G 110-170 may be a router, switch, or other network equipment adapted to receive and forward data packets toward the packets' respective destinations. Each node may also be connected to a number of additional devices (not shown) such as additional network devices and end user equipment.

Nodes A-G 110-170 may each be connected to one or more other nodes A-G 110-170 via one or more links. Each link may be associated with a link cost. For example, node C 130 may be connected to node D 140 via a link having cost 2. This link cost may be assigned based on various factors such as, for example, the geographic distance between the nodes, the bit-rate associated with the link, the number of intermediate devices between the nodes, and/or the current load on the link. Some links, such as the link between node B 120 and node G 170 may be faulty and thus undesirable for forwarding packets. Such links may accordingly be assigned a very high or infinite link cost to discourage use.

Each node A-G 110-170 may store a local representation of exemplary network 100. Such a local representation may be constructed locally from information conveyed in link state advertisement (LSA) messages transmitted by other nodes A-G 110-170 according to OSPF. For example, each node may store an indication of all nodes and edges in a Link State Database (LSDB). Such a representation may be used by each node A-G 110-170 to construct a shortest path tree and, ultimately, a forwarding table for use in forwarding packets to their destination.

FIG. 2 illustrates an exemplary shortest path tree (SPT) 200 for determining the optimal path from one node to a number of other possible nodes. SPT 200 may be constructed from the perspective of node C 130 using a representation of the current state of the network, such as exemplary network 100, using any method known to those of skill in the art. For example, a node may use Djikstra's Shortest Path Tree algorithm to construct an SPT.

SPT 200 may be an SPT constructed by node C 130 in view of exemplary network 100. SPT 200 may include a number of node representations A-G 210-270 corresponding to nodes A-G 110-170. SPT 200 may indicate the optimal path to each node within the network from node C 130. For example, SPT 200 indicates that the shortest path from node C 130 to node G 170 is through node D 140, rather than through node B 120 or some other path. Accordingly, packets received by node C 130 destined for node G 170 should be forwarded to node D 140, according to SPT 200. Node D 140, in turn, may include its own routing information enabling it to forward the packet to node G 170.

After computing SPT 200, node C 130 may update its forwarding table to reflect the new state of exemplary network 100. In particular, node C 130 may analyze SPT 200 to determine the next hop node that should be used for each potential destination node. This information may then be stored in a forwarding table for quick access when forwarding packets.

FIG. 3 illustrates an exemplary forwarding table 300 for determining a next hop to which a packet should be transmitted based on the packet destination. Forwarding table 300 may be, for example, a table in a database stored at node C 130. Alternatively, forwarding table 300 could be a series of linked lists, an array, or a similar data structure. Thus, it should be apparent that forwarding table 300 is an abstraction of the underlying data; any data structure suitable for storage of the underlying data may be used.

Forwarding table 300 may include a destination field 302 and a next hop field 304. Destination field 302 may indicate a destination device with which each entry is associated while next hop field 304 may indicate which next hop device is appropriate for the associated destination device. It should be apparent that forwarding table 300 is, in some respects, a simplification. For example, forwarding table may contain additional fields such as IP prefixes, an outgoing port number, a destination MAC address, and/or an alternate next hop. Various modifications will be apparent to those of skill in the art. It should be apparent that the data shown in exemplary table 300 is in some respects an abstraction and/or simplification; for example, destination field 302 may store an address of one or more destination nodes.

Forwarding table may include a number of entries 310-370. Entry 310 may indicate that packets destined for node A 110 should be forwarded to node B 120. Likewise, entries 320 and 350 may indicate that packets destined for node B 120 or node E 150 should be forwarded to node B 120. Entries 340, 360, 370 may indicate that packets destined for nodes D, F, G 140, 160, 170, respectively, should be forwarded to node D 140.

Having described the components of exemplary network 100, a brief summary of the operation of exemplary network 100 will be provided. It should be apparent that the following description is intended to provide an overview of the operation of exemplary network 100 and is therefore a simplification in some respects. The detailed operation of exemplary network 100 will be described in further detail below in connection with FIGS. 4-10.

After node C 130 has generated an up-to-date forwarding table, such as table 300, node C 130 may use its idle processing time to predict future network states that are likely to be seen next. Node C 130 may then pre-compute and store SPTs for each of these predicted states. Then, if the network transitions to one of the predicted states, the pre-computed SPT can be used immediately. Thus, the convergence time may be reduced, as node C 130 may immediately begin updating its forwarding table.

FIG. 4 illustrates an exemplary network node 400 for routing packets and reducing network convergence time. Network node 400 may correspond to one or more nodes A-G 110-170 in exemplary network 100. Network node 400 may include a packet receiver 405, a link state advertisement (LSA) identifier 410, a routing processor 420, a packet transmitter 425, a network state machine 430, a network state history storage 440, a shortest path tree (SPT) generator 450, a forwarding table generator 460, a forwarding table storage 470, and a network state predictor 480.

Packet receiver 405 may be an interface comprising hardware and/or executable instructions encoded on a machine-readable storage medium configured to receive packets from other network devices. Packet receiver 405 may include multiple ports and may receive packets from multiple network devices. For example, packet receiver 405 may receive link state advertisement packets and packets associated with regular network traffic.

Link state advertisement (LSA) identifier 410 may include hardware and/or executable instructions on a machine-readable storage medium configured to determine whether a received packet is an LSA that the node 400 should process. If the packet is an LSA, LSA identifier 410 may notify the network state machine 430 that a change has occurred in the network. For example, LSA identifier 410 may simply pass the packet to network state machine 410. Otherwise, LSA identifier may pass the packet to routing processor for further routing.

Routing processor 420 may include hardware and/or executable instructions on a machine-readable storage medium configured to route packets toward their destination. Routing processor may extract a destination from each received packet and determine a next hop for that destination by using a forwarding table stored in forwarding table storage 470. Routing processor may then forward the packet, via transmitter 425, to the appropriate next hop.

Packet transmitter 425 may be an interface comprising hardware and/or executable instructions encoded on a machine-readable storage medium configured to transmit packets to other network devices. Packet transmitter 425 may include multiple ports and may transmit multiple kinds of packets to multiple network devices. For example, packet transmitter 425 may transmit link state advertisement packets and packets associated with regular network traffic.

Network state machine 430 may include hardware and/or executable instructions on a machine-readable storage medium configured to interpret received LSAs to determine how the network state has changed. For example, network state machine may have access to a representation of the current network state and modify the network state based on the received LSA. The new network state representation may then be stored, for example, in network state history storage 440.

Network state machine 430 may further determine whether an SPT is already available for the new network state based on the received LSA. The detailed operation of an exemplary embodiment of network state machine 430 will be described in further detail below with respect to FIG. 9. If the network state machine 430 is able to locate a pre-computed SPT, network state machine 430 may forward the SPT to forwarding table generator 460. Otherwise, network state machine 430 may send an indication to SPT generator 450 that a new SPT should be generated.

In various embodiments, when network state machine 430 enters a new state, it may delete the representation of the previous state. In various alternative embodiments, network state machine may retain the previous state and any SPT, forwarding table, routing table, and/or other routing information associated with it. Network state machine 430 may further generate one or more transitions, as will be described in further detail below with reference to FIG. 9, for re-entering the previous state from the new state. For example, network state machine 430 may generate a transition that is the opposite of the LSA just processed and leads back to this previous state.

Network state history storage 440 may be any machine-readable medium capable of storing representations of previous and/or current network states. Accordingly, network state history storage 440 may include a machine-readable storage medium such as read-only memory (ROM), random-access memory (RAM), magnetic disk storage media, optical storage media, flash-memory devices, and/or similar storage media.

Shortest path tree (SPT) generator 450 may include hardware and/or executable instructions on a machine-readable storage medium configured to generate a shortest path tree from a representation of a network. For example, SPT generator 450 may use Djikstra's algorithm or any other method known to those of skill in the art to generate a shortest path tree. Once an SPT is generated, SPT generator 450 may send the SPT to forwarding table generator if the SPT represents the current network state. If, on the other hand, the new SPT represents a predicted network state, as will be described in greater detail below, SPT generator 450 may pass the new SPT to network state machine 430 for possible future use. Network state machine 430 may then store the SPT in its own local memory or other storage device within the node 400.

Forwarding table generator 460 may include hardware and/or executable instructions on a machine-readable storage medium configured to generate or update a forwarding table based on an SPT. For example, forwarding table generator may determine whether any entries in forwarding table storage 470 should be added or modified based on the current SPT for the network node 400.

Forwarding table storage 470 may be any machine-readable medium capable of storing a forwarding table. Accordingly, forwarding table storage 470 may include a machine-readable storage medium such as read-only memory (ROM), random-access memory (RAM), magnetic disk storage media, optical storage media, flash-memory devices, and/or similar storage media. Forwarding table storage 470 may be an independent storage device within node 400 or may be the same as network state history storage 440.

Network state predictor 480 may include hardware and/or executable instructions on a machine-readable storage medium configured to predict possible future network states. Such prediction may be based on a number of factors such as, for example, the current network state, previously seen network states, likelihood of potential changes, and the relevance of potential changes to the network. For example, if the data in network state history storage 440 indicates that a particular link that is currently available has frequently entered a faulty state causing a change to the forwarding table, network state predictor 480 may indicate that the link is likely to be indicated as having failed in the next LSA. On the other hand, if network state predictor determines that a frequently failing link rarely necessitates a change in the forwarding table, the network state predictor 480 might refrain from reporting or considering this potential state as a likely future state. It should be apparent that numerous methods and criteria may be employed for determining which network states are most advantageous to pre-compute.

Network state predictor 480 may use the idle time of the network node 400 to predict future network states while the network node 400 is not busy performing other tasks. Network state predictor 480 may predict one state at a time or may generate a list of predicted states. Such a list may be ordered in descending order of likelihood/relevance. Thereafter, network state predictor 480 may transmit predicted states to shortest path tree generator during the network node's 400 idle time so SPTs may be pre-computed for each of the predicted states. Idle time may be identified by the network node 400 as time when the node 400 processor is not busy performing other tasks. Network state predictor 480 may continue in this manner until SPTs associated with a certain number of states have been pre-computed or until a certain amount of memory has been used in storing the pre-computed SPTs.

In some embodiments, network state predictor 480 may predict future states that do not result in a change to any routing information. In such a case, network state machine 430 may ignore such predictions or may store an indication that either the current SPT may be used or no action should be taken in response to such a network change.

When the network state changes, network state predictor 480 may start from scratch and generate a new set of predicted states and SPTs. Alternatively, network state predictor 480 may attempt to reuse previously pre-computed SPTs, replacing only those least relevant or likely to occur in light of the current network state.

It should be noted that while exemplary node 400 is described in terms of pre-computing shortest path trees, various alternative embodiments may pre-compute alternative or additional types of routing information. For example, a node (not shown) may pre-compute the forwarding table itself, a portion thereof, a routing table, or portion thereof. For systems employing standards other than OSPF, routing information specific to those standards may be pre-computed. Modifications useful in implementing such alternative embodiments will be apparent to those of skill in the art.

Figure 5:
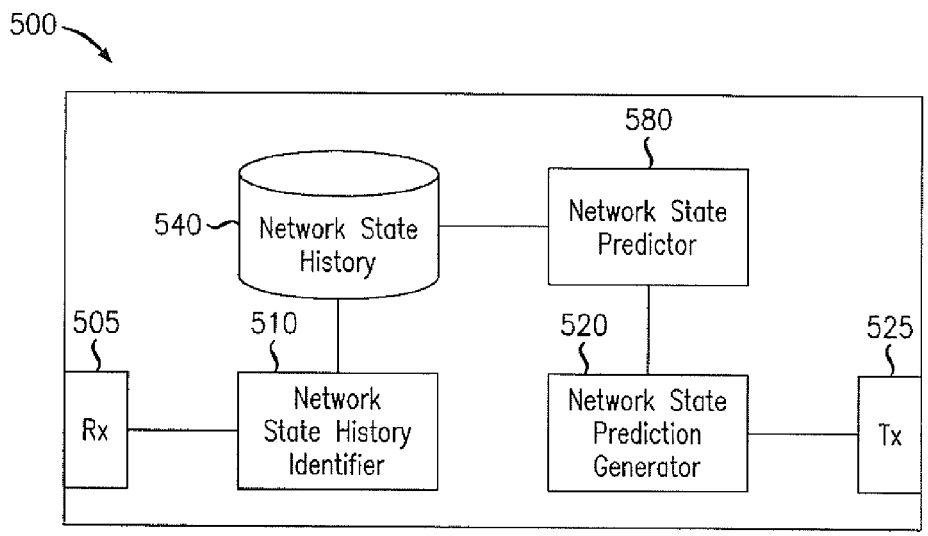
FIG. 5 illustrates an exemplary prediction node for predicting likely future network states.

FIG. 5 illustrates an exemplary prediction node 500 for predicting likely future network states. Prediction node 500 may correspond to one or more nodes A-G 110-170 in exemplary network 100 or an additional node (not shown). Prediction node 500 may be adapted to operate in conjunction with one or more nodes A-G 110-170 to predict future SPTs. Prediction node 500 may include a packet receiver 505, a network state history identifier 510, a network state prediction generator 520, a packet transmitter 525, a network state history storage 540, and a network state predictor 580. Prediction node 500 may include additional other components. For example, in various embodiments where prediction node 500 is also a router, prediction node 500 may include one or more elements of network node 400.

Packet receiver 505 may be an interface comprising hardware and/or executable instructions encoded on a machine-readable storage medium configured to receive packets from other network devices. Packet receiver 505 may include multiple ports and may receive packets from multiple network devices. For example, packet receiver 505 may receive link state advertisement packets, other network state history packets, and/or packets associated with regular network traffic.

Network state history identifier 510 may include hardware and/or executable instructions on a machine-readable storage medium configured to determine whether a packet received via packet receiver 505 includes network state history. In some embodiments, such a packet may be an LSA. In other embodiments where other network nodes are adapted to communicate information regarding the network state, such a packet may be a specially constructed packet transmitted by another node to the prediction node 500. Such packets may be transmitted periodically or whenever there is an update to the network state seen by the originating node. Upon identifying a network state history packet, network state history identifier 510 may update the data stored in network state history storage to reflect the update.

Network state prediction generator 520 may include hardware and/or executable instructions on a machine-readable storage medium configured to generate network state prediction messages for transmission to other nodes. For example, network state prediction generator 520 may construct a packet containing a single network state prediction or an ordered list of network state predictions generated by network state predictor 580. Thereafter, network state prediction generator may transmit the new packet to one or more other nodes via packet transmitter 525. As will be described with reference to network state predictor 580, below, predictions may be applicable to multiple nodes or only a single node. Network state prediction generator 520 may forward the new packet to only those nodes to which the prediction is applicable.

Packet transmitter 525 may be an interface comprising hardware and/or executable instructions encoded on a machine-readable storage medium configured to transmit packets to other network devices. Packet transmitter 525 may include multiple ports and may transmit packets to multiple network devices. For example, packet transmitter 425 may transmit link state advertisement packets, network state prediction packets, and/or packets associated with regular network traffic.

Network state history storage 540 may be any machine-readable medium capable of storing representations of previous and/or current network states. Accordingly, network state history storage 540 may include a machine-readable storage medium such as read-only memory (ROM), random-access memory (RAM), magnetic disk storage media, optical storage media, flash-memory devices, and/or similar storage media.

Network state predictor 580 may include hardware and/or executable instructions on a machine-readable storage medium configured to predict possible future network states. In this respect, network state predictor may be similar or identical to network state predictor 480.

Network state predictor 580 may be further adapted to generate predictions within the context of particular nodes. Accordingly, network state predictor may generate different predictions for different nodes within the network. For example, network state predictor may determine that one likely future network state will necessitate an update to a first node's forwarding table but not a second node's forwarding table. Accordingly, network state predictor 580 may indicate that this future network state should be reported to the first node but not the second.

Figure 6:
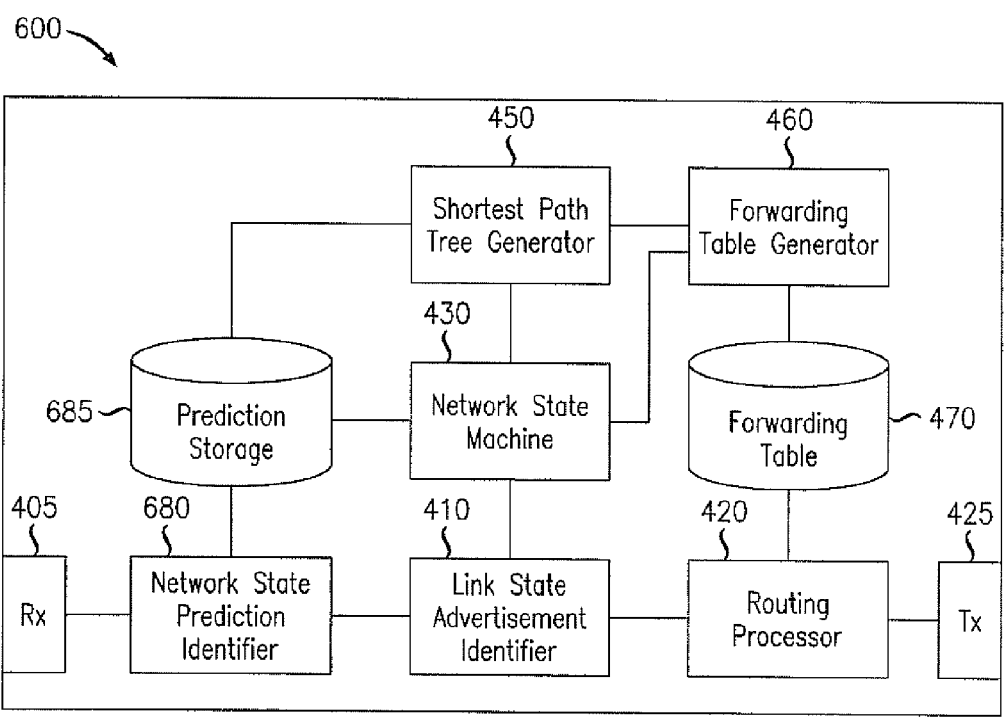
FIG. 6 illustrates an exemplary embodiment of a network node for routing packets and reducing network convergence time in cooperation with a prediction node.

FIG. 6 illustrates an exemplary embodiment of a network node 600 for routing packets and reducing network convergence time in cooperation with a prediction node. Network node 600 may correspond to one or more nodes A-G 110-170 in exemplary network 100. Network node 600 may include a packet receiver 405, a network state prediction identifier 680, a link state advertisement (LSA) identifier 410, a routing processor 420, a packet transmitter 425, a network state machine 430, a prediction storage 685, a shortest path tree (SPT) generator 450, a forwarding table generator 460, a forwarding table storage 470, and a network state predictor 480. Accordingly, a number of the elements of network node 600 may be similar or identical to various elements of network node 400.

Network state prediction identifier 680 may include hardware and/or executable instructions on a machine-readable storage medium configured to determine whether a received packet includes a network state prediction, such as a network state prediction message constructed and transmitted by a prediction node 500. If a received packet includes such information, network state prediction identifier 680 may extract one or more network state predictions from the packet and store them in prediction storage 685. Thereafter, shortest path tree generator 450 may use network node's 600 idle processing time to compute SPTs in accordance with the predicted network states and update network state machine 430.

Prediction storage 685 may be any machine-readable medium capable of storing representations of current and/or predicted network states. Accordingly, prediction storage 685 may include a machine-readable storage medium such as read-only memory (ROM), random-access memory (RAM), magnetic disk storage media, optical storage media, flash-memory devices, and/or similar storage media.

Figure 7:
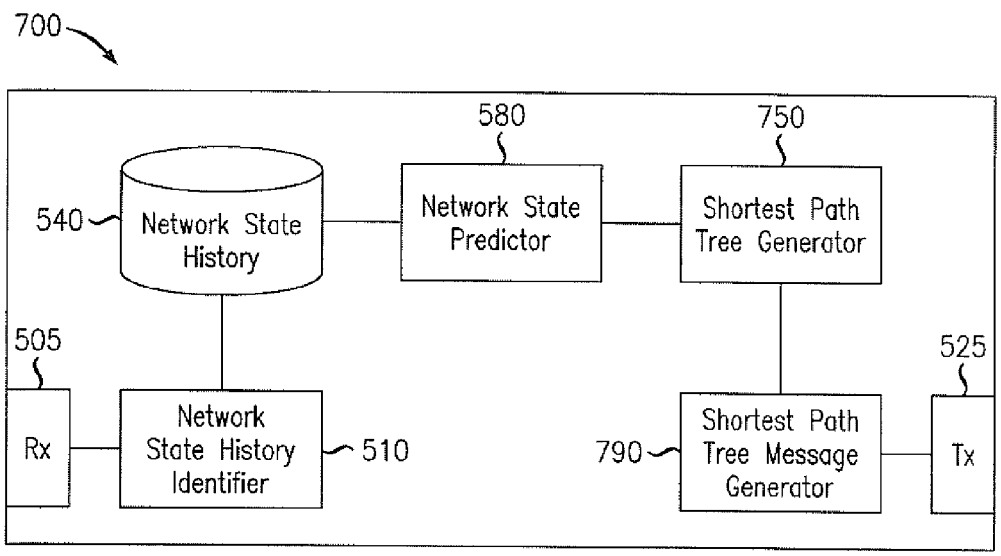
FIG. 7 illustrates an alternative embodiment of a prediction node for predicting likely future network states.

FIG. 7 illustrates an alternative embodiment of a prediction node 700 for predicting likely future network states. Prediction node 700 may correspond to one or more nodes A-G 110-170 in exemplary network 100 or an additional node (not shown). Prediction node 700 may be adapted to operate in conjunction with one or more nodes A-G 110-170 to predict future SPTs. Prediction node 700 may include a packet receiver 505, a network state history identifier 510, a packet transmitter 525, a network state history storage 540, a network state predictor 580, a shortest path tree generator 750, and a shortest path tree message generator 790. Accordingly, a number of the elements of prediction node 700 may be similar or identical to various elements of prediction node 500. Prediction node 700 may include additional other components. For example, in various embodiments where prediction node 700 is also a router, prediction node may include one or more elements of network node 400.

Shortest path tree (SPT) generator 750 may include hardware and/or executable instructions on a machine-readable storage medium configured to generate a shortest path tree from a representation of a network. Accordingly, SPT generator 750 may be similar or identical to SPT generator 450 of network node 400. SPT generator 750 may use the idle time of prediction node 700 to generate one or more SPTs for predicted network states generated by network state prediction generator 580.

Shortest path tree (SPT) message generator 790 may include hardware and/or executable instructions on a machine-readable storage medium configured to generate SPT prediction messages for transmission to other nodes. For example, SPT message generator 790 may construct a packet containing a single network state prediction and associate SPT or an ordered list of network state predictions with associated SPTs generated by network state predictor 580 and SPT generator 750. Thereafter, SPT message generator 790 may transmit the new packet to one or more other nodes via packet transmitter 525. As previously described, predictions may be applicable to multiple nodes or only a single node. SPT message generator 790 may forward the new packet to only those nodes to which the prediction is applicable.

Figure 8:
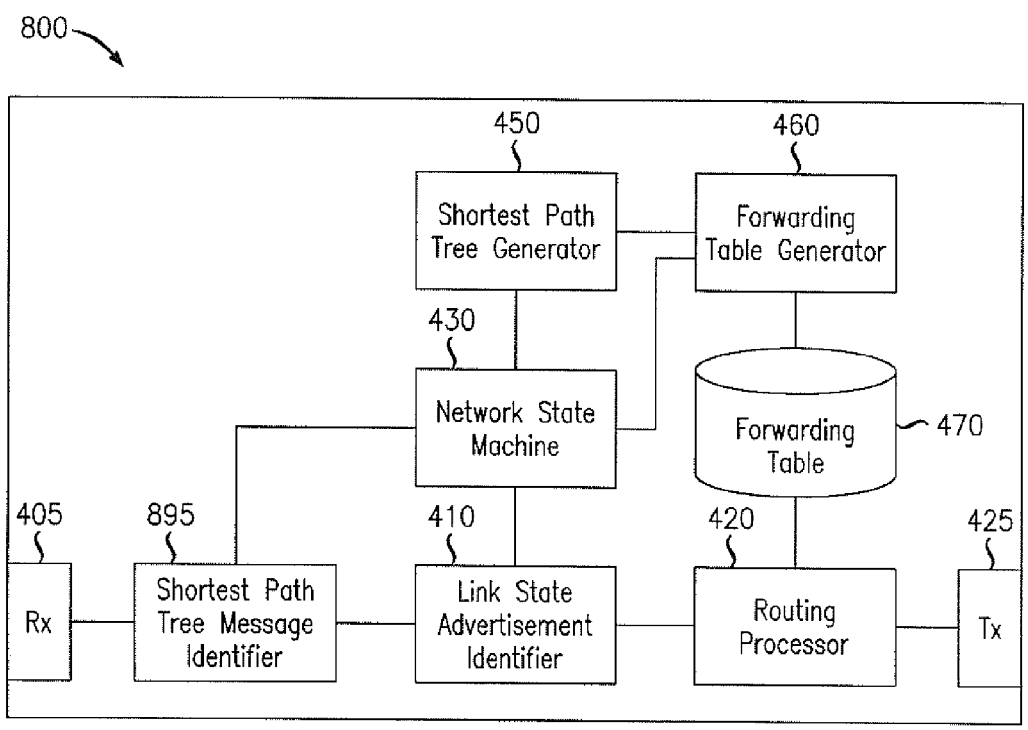
FIG. 8 illustrates an alternative embodiment of a network node for routing packets and reducing network convergence time in cooperation with a prediction node.

FIG. 8 illustrates an alternative embodiment of a network node 800 for routing packets and reducing network convergence time in cooperation with a prediction node. Network node 800 may correspond to one or more nodes A-G 110-170 in exemplary network 100. Network node 800 may include a packet receiver 405, a shortest path tree (SPT) message identifier 895, a link state advertisement (LSA) identifier 410, a routing processor 420, a packet transmitter 425, a network state machine 430, a shortest path tree (SPT) generator 450, a forwarding table generator 460, a forwarding table storage 470, and a network state predictor 480. Accordingly, a number of the elements of network node 800 may be similar or identical to various elements of network node 400 and/or network node 600.

Shortest path tree (SPT) message identifier 895 may include hardware and/or executable instructions on a machine-readable storage medium configured to determine whether a received packet includes one or more predicted SPTs, such as an SPT message generated by a prediction node 700. If a received packet includes such information, SPT message identifier 895 may forward the predicted SPTs to network state machine 430 for potential future use.

Figure 9:
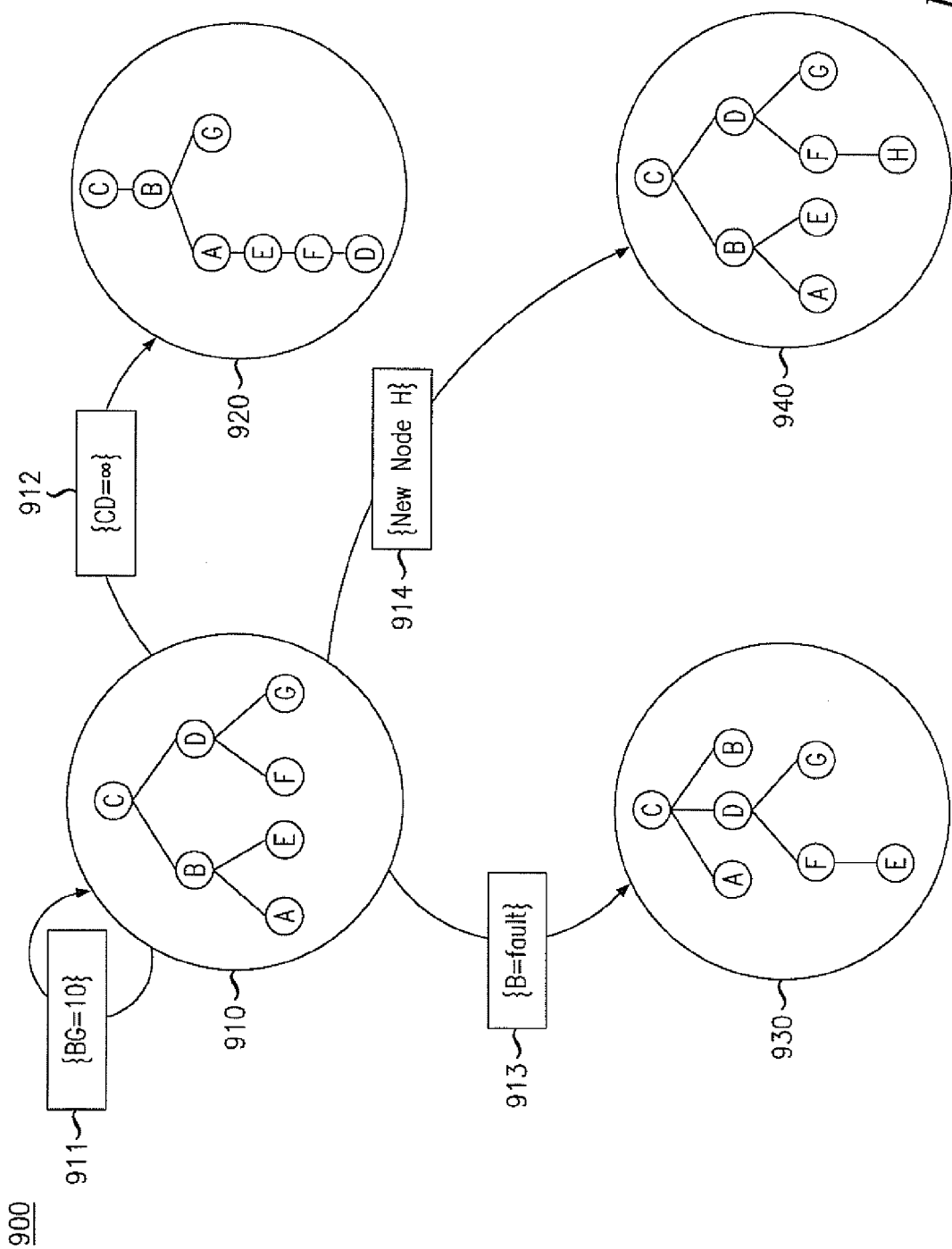
FIG. 9 illustrates an exemplary state machine for locating pre-computed routing information.

FIG. 9 illustrates an exemplary state machine 900 for locating pre-computed routing information. State machine 900 may correspond to programming of and/or one or more data structures managed by a network state machine 430. State machine 900 may include a current state 910, a number of potential states 920, 930, 940, and a number of potential transitions 911, 912, 913, 914. Each state 910, 920, 930, 940 may further be associated with a SPT.

Transition 911 originates and terminates at current state 910. Transition 911 indicates that it would be applicable if an LSA were to indicate that the link between node B 120 and node G 170 were restored to a link cost of 10. Because transition 911 loops back to the same state, it indicates that in the event of such an LSA, no change will be made to the appropriate SPT for the node. The node may then determine that no further action is necessary.

Transition 912 originates at current state 910, terminates at potential state 920, and would be applicable to an LSA indicating a failure of the link between node C 130 and node D 140. In such an event, the node would use the SPT associated with state 920 and consequently avoid use of the newly failed link.

Transition 913 originates at current state 910, terminates at potential state 930, and would be applicable to an LSA indicating a failure node B 120. In such an event, the node would use the SPT associated with state 930 and consequently avoid sending traffic to node B 120 unless absolutely necessary. In this example, only traffic destined for node B 120 will be sent to node B 120.

Transition 914 originates at current state 910, terminates at potential state 940, and would be applicable to an LSA indicating that a new node H (not shown) connected only to node F 160 has been added to the network. In such an event, the node would use the SPT associated with state 940 and thereafter send traffic to the new node via node D 140.

It should be noted that the transition criteria shown are meant as an example. Additional transition criteria will be apparent to those of skill in the art. For example, the removal of a node from the network may be used as criteria. As a further example, multiple changes may be indicated in a single transition. For example, a transition (not shown) may be added from state 910 to state 913 that is applicable to an LSA reporting both a fault in B and the link between B and G.

Figure 10:
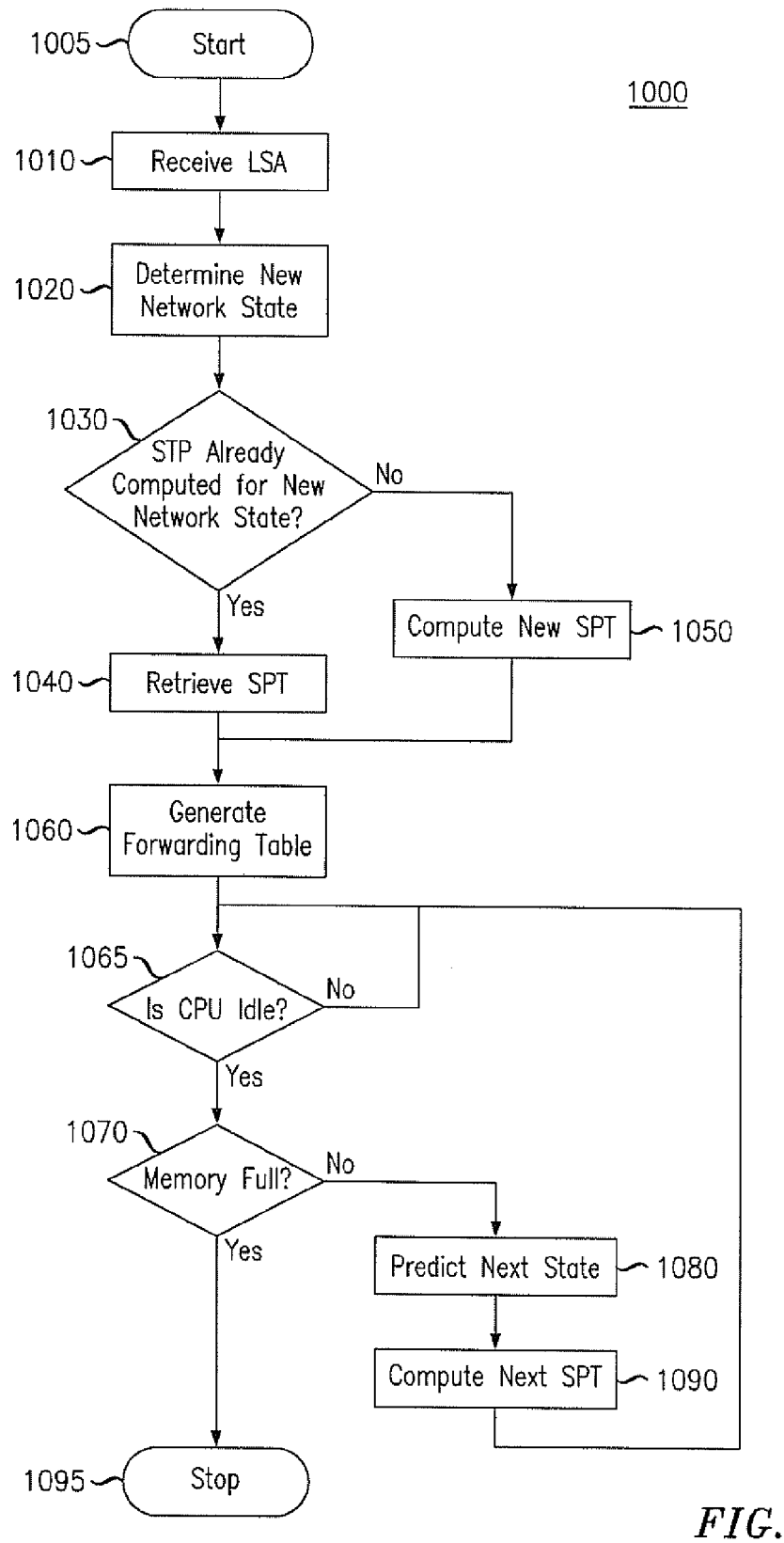
FIG. 10 illustrates an exemplary method for reducing network convergence time.

FIG. 10 illustrates an exemplary method 1000 for reducing network convergence time. Method 1000 or portions thereof may be performed by the components of network node 400, 500, 600, 700, and/or 800.

Method 1000 begins in step 1000 and proceeds to step 1010 where the network node receives an LSA. Then, in step 1020, the node may determine what the new network state is. For example, the node may apply the LSA to a state machine as described above. In step 1030, the node may determine whether a shortest path tree (SPT) has already been computed for the new network state. For example, the node may determine whether a state exists in the state machine for the LSA and/or whether an SPT is associated with the state. If so, the node may simply retrieve the pre-computed SPT in step 1040.

On the other hand, if no pre-computed SPT is available, the node may compute a new SPT in step 1050. Regardless of the procurement method, once an SPT is available, the node may proceed to generate a forwarding table in step 1060.

In various embodiments where a second node generates predicted SPTs for other nodes, such as in the embodiments of FIGS. 7 and/or 8, the method 1000 may proceed directly to step 1095. Otherwise, method 1000 may proceed to step 1065, where the node may determine whether at least one of the node's CPUs or cores is currently idle. Method 1000 may wait at step 1065 until a CPU is idle before proceeding. Alternatively, method 1000 may be interrupted or halted during this waiting period by other events such as the receipt of a new LSA. When the node determines that a CPU is currently idle, Method 100 may proceed to step 1070. In step 1070, the node may determine whether enough memory is available to store an additional SPT. Alternatively or additionally, node may determine whether a satisfactory number of SPTs have been pre-computed. If more SPTs can and/or should be pre-computed, method 1000 proceeds to step 1080. In various embodiments, in order to accommodate SPTs for predicted states, one or more less relevant SPTs may be purged from memory.

In step 1080, the node determines a predicted state. This may include the steps of predicting a future state locally and/or reading a predicted state provided by an external node. Method 1000 then proceeds to step 1090, where the node computes a new SPT based on the predicted network state. Method 1000 then loops back to step 1065 to repeat the process.

Once either the memory is full or a satisfactory number of SPTs have been pre-computed, depending on the embodiment, method 1000 will proceed from step 1070 to end in step 1095.

It should be apparent that while the node is pre-computing SPTs, new LSAs may arrive. Various embodiments may provide that the SPT pre-computation procedure of steps 1070-1090 may be interrupted or prematurely halted to process the new LSA. Additional modifications for real-world implementation will be apparent to those of skill in the art.

According to the foregoing various exemplary embodiments enable reduction of network convergence time. In particular, by pre-computing routing information, such as SPTs and/or forwarding tables, for likely future network states, a network node can reduce the amount of time spent updating a forwarding table after the network actually changes.

It should be apparent from the foregoing description that various exemplary embodiments of the invention may be implemented in hardware, software, and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of reducing routing path convergence time in a network performed in a network node, the method comprising:

generating an ordered set of predicted future network states, wherein the ordered set of predicted future states is ordered based on a likelihood of the network transitioning to each of the respective future network states;

determining the first future network state within the ordered set of predicted future network states for which routing information has not already been computed;

computing predicted routing information based on the first future network state;

storing the predicted routing information in association with the first future network state at the node;

receiving, at the node, an indication that a current network state has changed to a new network state from an old network state;

determining whether the node has access to pre-computed routing information associated with the new network state if the node has access to pre-computed routing information associated with the new network state, using the pre-computed routing information to route future network traffic; and if the node does not have access to pre-computed routing information associated with the new network state, computing new routing information and using the new routing information to route future network traffic.

2. The method of claim 1, wherein the step of computing is performed at a second network node distinct from the network node.

3. The method of claim 1 wherein the pre-computed routing information and the new routing information are both shortest path trees.

4. The method of claim 1 wherein the pre-computed routing information and the new routing information are both forwarding tables.

5. The method of claim 1 wherein using routing information to route future network traffic comprises computing a forwarding table based on the routing information.

6. The method of claim 1, further comprising:
after receiving the indication that a current network state has changed, storing old routing information associated with the old network state at the node in association with the old network state.

7. The method of claim 1, further comprising storing a history of previous network states.

8. The method of claim 1, further comprising:
determining whether a memory of the network node is full; and
if the memory is not full:
computing additional predicted routing information based on an additional future network state; and
storing the additional predicted routing information in association with the additional future network state at the node.

9. The method of claim 1, wherein the network node only computes predicted routing information when a processor of the network node would otherwise be idle.

10. A network node that reduces routing path convergence time in a network, the network node comprising:
a processor;
a first interface that receives network state information; and
a network state predictor that predicts an ordered set of predicted future network states based on the network state information, wherein the ordered set of predicted future states is ordered based on a likelihood of the network transitioning to each of the respective future network states; and
a routing information generator that generates at least one set of routing information based on the ordered set of predicted future network states.

11. The network node of claim 10, wherein the network state information includes at least one of a link state advertisement, a description of a current network state, and a description of a network state history.

12. The network node of claim 10, further comprising:
a network state prediction generator that generates a prediction message that includes the at least one future network state; and
a second interface that transmits the prediction message to a second network node.

13. The network node of claim 12,
wherein the network state prediction generator is a routing information message generator and the prediction message further includes the at least one set of routing information.

14. The network node of claim 10, further comprising:
a second interface;
a forwarding table storage that stores a forwarding table;
a routing processor that:
receives network traffic via the first interface,
determines a next hop of the network traffic using the forwarding table, and
transmits the network traffic to the next hop via the second interface.

15. The network node of claim 10, further comprising:
a link state advertisement identifier that determines whether a message received via the first interface includes a link state advertisement;
a network state machine that:
determines a new network state based on the link state advertisement,
determines whether the at least one future network state includes the new network state,
if the at least one future network state includes the new network state, identifies predicted routing information associated with the new network state within the at least one set of routing information, and
if the at least one future network state does not include the new network state, indicates to the routing information generator that new routing information should be generated for the new network state.

16. The network node of claim 10, further comprising:
a prediction storage configured to store the predicted routing information,
wherein the routing information generator is configured to determine whether the prediction storage is full, and if the prediction storage is not full: compute additional predicted routing information based on an additional future network state; and store the additional predicted routing information in the prediction storage in association with the additional future network state.

17. A non-transitory machine-readable storage medium encoded with instructions for reducing routing path convergence time in a network performed in a network node, the machine-readable storage medium comprising:
instructions for generating an ordered set of predicted future network states, wherein the ordered set of predicted future states is ordered based on a likelihood of the network transitioning to each of the respective future network states;
instructions for determining a first future network state within the ordered set of predicted future network states for which routing information has not already been computed;
instructions for computing predicted routing information based on the first future network state;

instructions for storing the predicted routing information in association with the first future network state at the node;

instructions for receiving, at the node, an indication that a current network state has changed to a new network state from an old network state;

instructions for determining whether the node has access to pre-computed routing information associated with the new network state;

instructions for, if the node has access to pre-computed routing information associated with the new network state, using the pre-computed routing information to route future network traffic; and instructions for, if the node does not have access to pre-computed routing information associated with the new network state, computing new routing information and using the new routing information to route future network traffic.

18. The non-transitory machine-readable storage medium of claim 17 wherein the instructions for using routing information to route future network traffic comprise instructions for computing a forwarding table based on the routing information.

19. The non-transitory machine-readable storage medium of claim 17, further comprising:

instructions for, after receiving the indication that a current network state has changed, storing old routing information associated with the old network state at the node in association with the old network state.

20. The non-transitory machine-readable storage medium of claim 17, further comprising:

determining whether a memory of the network node is full; and if the memory is not full:

computing additional predicted routing information based on an additional future network state; and storing the additional predicted routing information in association with the additional future network state at the node.

* * * * *